Figure 1:
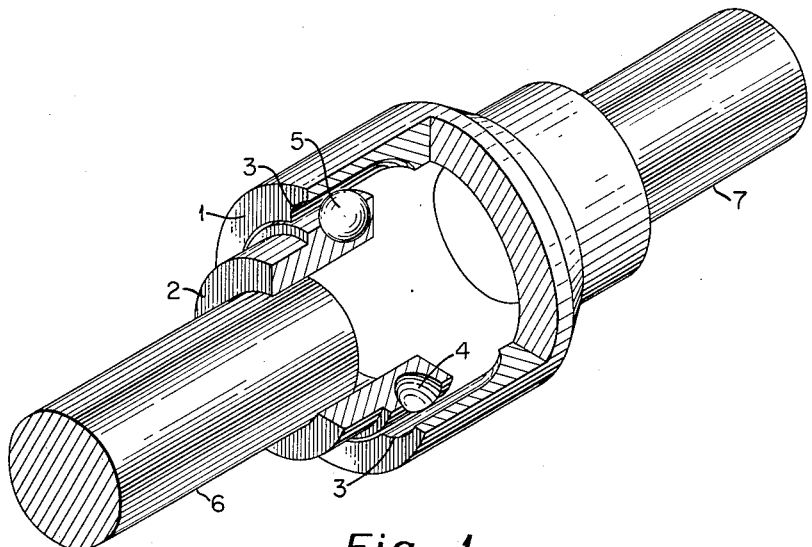

Feb. 13, 1962   E. F. BABELAY   3,020,736
FLEXIBLE COUPLING
Filed Nov. 20, 1959

INVENTOR.
Edwin F. Babelay
BY
ATTORNEY

United States Patent Office 3,020,736
Patented Feb. 13, 1962

3,020,736
FLEXIBLE COUPLING
Edwin F. Babelay, Knoxville, Tenn., assignor to the United States of America as represented by the United States Atomic Energy Commission
Filed Nov. 20, 1959, Ser. No. 854,523
3 Claims. (Cl. 64—8)

The present invention relates to an improved flexible coupling for accommodation of parallel and/or angular misalignments of shafts.

One of the contributing causes of failure in the operation of high speed—in excess of 14,000 r.p.m.—centrifugal pumps has been the failure of the flexible coupling linkage, between the motors and pump shafts. The coupling is intended to effectively eliminate or isolate any misalignments or vibratory disturbances during operation. In certain processes, utilizing high speed centrifugal pumps, it is essential to minimize vibrational disturbances during operation of the pumps since excessive vibration is very likely to cause a leakage of process fluid through the pump shaft seals. Preventing such leakage is very important in processes where the process fluid is hazardous from a health standpoint.

Certain types of flexible couplings employ the use of loosely coupled gear teeth and means is provided for lubricating the couplings. The limited misalignment compensation properties and the inability of the gear tooth type of coupling to effectively isolate vibratory disturbances, plus the added problem of maintaining proper lubrication at the operating high speeds, resulted in failure and undependable service in centrifugal pumps using this type of coupling.

Other types of flexible couplings have been used and these generally employ the use of balls or resiliently compressible rings which are closely fitted into confronting recesses in the driving and driven sleeve members. Use of these types of couplings, however, is unsatisfactory at very high operating speeds because of their inability to prevent undesirable vibrations from being transmitted from the driving to the driven sleeve member, and their inability to provide for accommodation of axial displacement and both parallel and angular misalignments. Also, due to the close metal-to-metal coupling of these types of couplings, when operated at high speeds, excessive heat will be created and will cause unsatisfactory operation or failure of the coupling due to the problem of maintaining proper lubrication at such high speeds.

With a knowledge of the shortcomings of prior art flexible couplings, as discussed above, it is a primary object of this invention to provide a flexible shaft coupling which will accommodate for both parallel and angular misalignments and for axial displacement and still avoid metal-to-metal contact between the driving and driven sleeve members, at operations in excess of 14,000 r.p.m.

It is another object of this invention to provide a flexible coupling which will require no lubrication means.

It is a further object of this invention to provide a flexible coupling which will have a long life expectancy and effectively isolate any vibratory disturbances and prevent these disturbances from being transmitted from the driving member to the driven component.

Figure 2:
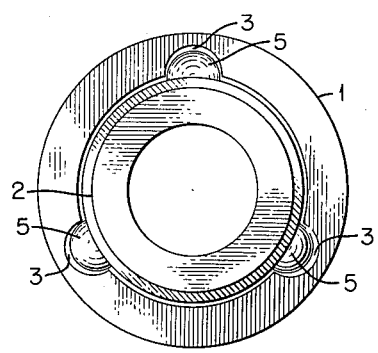

These and other objects and advantages of this invention will become apparent from a consideration of the following detailed specification and the accompanying drawing, wherein:

FIG. 1 is an isometric view with a cut-away section of my flexible coupling, and FIG. 2 is an end view of the flexible coupling of FIG. 1.

The above objects have been accomplished in the present invention by providing a driving and a driven rotary sleeve member, in concentrically spaced relationship, and each keyed or attached by any suitable means to its respective shaft. A torque force is transmitted to the driven member from the driving member through a plurality of resilient, non-metallic balls symmetrically disposed between the concentrically spaced sleeves. Each of the balls is positioned and retained therein by a longitudinally extending race on one of the rotating sleeve members and a spherical ball-receiving recess on the other rotating sleeve member. The sleeve members have a suitable clearance therebetween and the balls have a suitable radial clearance to accommodate for both parallel and/or angular misalignments and to avoid metal-to-metal contact between the sleeve members.

Refer now to the drawing which illustrates one embodiment in which the principles of this invention may be carried out. A rotary driving sleeve member 1 is attached to a shaft 7 of a driving motor, not shown, by any suitable fastening means. Sleeve member 1 is spaced in concentrical relation to an inner rotary driven sleeve member 2. Sleeve member 2 is attached to a shaft 6 of a driven component, not shown, which may, for example, be the shaft of a centrifugal pump, by any conventional coupling means. Driving sleeve member 1 has three longitudinally extending races 3, equi-angularly disposed about the inner periphery thereof. The driven sleeve member 2 contains three equi-angularly disposed spherical recesses 4 in register with the aforementioned longitudinally extending races 3. A torque force is transmitted from the driving to the driven sleeve member through three nylon balls 5 located between the sleeves 1 and 2, with each of the balls extending into one of the spherical recesses 4 in the driven sleeve 2 and into one of the corresponding races 3 on the driving sleeve 1.

The nylon balls 5, spherical recesses 4, and the arcuate configuration of the races 3 have identical radii. The outer diameter of the driven sleeve 2 is slightly less than the inner diameter of the driving sleeve 1 to provide radial clearance therebetween. By providing this clearance, neither parallel nor angular misalignments cause malfunctioning. The use of nylon balls for the transmitting of torque eliminates metal-to-metal contact between the sleeve members, thus obviating any need for lubrication. Moreover, highly undesirable vibrations are essentially prevented from being transmitted from the driving to the driven sleeve member by the loose coupling between the sleeve members.

FIG. 2 shows an end view of the coupling of FIG. 1. It should be noted that although the longitudinal races 3, nylon balls 5, and the spherical recesses 4 have identical radii, as stated above, the nylon balls within the coupling have radial clearance which is provided by and related to the clearance between the driving and driven sleeves.

In a typical operation of the above described coupling, centrifugal force will move the nylon balls from their spherical recesses outwardly, so that they are brought to bear and maintained against the arcuate configuration of the races 3 of the driving sleeve 1. The nylon balls, although in contact with the races 3, extend substantially within the spherical recesses 4 of the driven sleeve 2, thereby transmitting torque force to the driven sleeve member. It should be apparent that the degree of parallel misalignment that can be tolerated will be determined by the amount of clearance provided between the sleeve members. End float and angular misalignment are isolated by means of the longitudinally extending races 3 of the driving sleeve 1. Parallel and angular misalignments are resolved and isolated by the automatic positioning of the nylon balls, radially and longitudinally, within their confined region, while maintaining continuous contact with the driving and the driven sleeve members, thus essentially preventing vibration fluctuations from being transmitted from the driving to the driven sleeve member. As indicated above, the lack of metal-to-metal contact between the sleeves eliminates the need for lubrication of the coupling.

This invention has been described by way of illustration rather than limitation and it should be apparent that the invention is equally applicable in fields other than those described.

What is claimed is:

1. An improved flexible shaft coupling for operation at speeds in excess of 14000 r.p.m. and which requires no lubrication comprising coaxial, concentrically disposed driving and driven sleeve members, one of said sleeve members being provided with at least three equi-angularly disposed axially extending and longitudinally extending ball races, the other of said sleeve members being provided with at least three equi-angularly disposed ball recesses of spherical segment configuration in register with said races, and a nylon ball disposed in each of said recesses and extending into the corresponding race, said balls, recesses, and races having radii of curvature substantially equal, the outer diameter of one of said sleeves being slightly less than the inner diameter of the other of said sleeves to thus provide a radial clearance therebetween, said clearance being sufficiently great to avoid metal-to-metal contact between said sleeve members during operation and to accommodate axial displacement and both parallel and angular misalignments, said clearance also providing a radial clearance between said balls and said recesses during operation to thereby essentially prevent undesirable vibration fluctuations from being transmitted to the driven sleeve member from the driving sleeve member, said sleeve members being respectively affixed to a driving shaft and a driven shaft.

2. The coupling set forth in claim 1, wherein said races are disposed in said driving sleeve member, and said recesses are disposed in said driven sleeve member.

3. The coupling of claim 1 wherein said races are disposed in said driven sleeve member and said recesses are disposed in said driving sleeve member.

References Cited in the file of this patent
UNITED STATES PATENTS

| | | |
|---|---|---|
| 1,103,716 | Wallbillich | July 14, 1914 |
| 1,620,285 | Pollak | Mar. 8, 1927 |
| 2,099,848 | Grodhaus | Nov. 23, 1937 |
| 2,441,052 | Wilmer | May 4, 1948 |
| 2,609,256 | Baker et al. | Sept. 2, 1952 |
| 2,699,656 | Anderson et al. | Jan. 18, 1955 |
| 2,705,113 | Bonanno | Mar. 29, 1955 |
| 2,897,660 | Croset | Aug. 4, 1959 |